US011231108B2

(12) United States Patent
Kim et al.

(10) Patent No.: US 11,231,108 B2
(45) Date of Patent: Jan. 25, 2022

(54) COMPOSITE SEAL MEMBER

(71) Applicant: Valqua, Ltd., Tokyo (JP)

(72) Inventors: Sangho Kim, Gojo (JP); Michi Kuroda, Gojo (JP); Nobuhiro Yoshida, Gojo (JP); Ippei Nakagawa, Gojo (JP)

(73) Assignee: Valqua, Ltd., Tokyo (JP)

( * ) Notice: Subject to any disclaimer, the term of this patent is extended or adjusted under 35 U.S.C. 154(b) by 207 days.

(21) Appl. No.: 16/479,016

(22) PCT Filed: Jan. 24, 2018

(86) PCT No.: PCT/JP2018/002066
§ 371 (c)(1),
(2) Date: Jul. 18, 2019

(87) PCT Pub. No.: WO2018/143026
PCT Pub. Date: Aug. 9, 2018

(65) Prior Publication Data
US 2019/0353250 A1    Nov. 21, 2019

(30) Foreign Application Priority Data

Jan. 31, 2017  (JP) .............................. JP2017-015233

(51) Int. Cl.
*F16J 15/10* (2006.01)
(52) U.S. Cl.
CPC .................................. *F16J 15/104* (2013.01)
(58) Field of Classification Search
CPC ......... F16J 15/104; F16J 15/062; F16J 15/166
See application file for complete search history.

(56) References Cited

U.S. PATENT DOCUMENTS 3,215,441 A * 11/1965 Horvereid ................ F16J 15/32
277/437
3,521,893 A * 7/1970 Josephson .............. F16J 15/166
277/584

(Continued)

FOREIGN PATENT DOCUMENTS

CN         101384842 A     3/2009
CN         102466052 A     5/2012

(Continued)

*Primary Examiner* — Eugene G Byrd
(74) *Attorney, Agent, or Firm* — The Webb Law Firm

(57) ABSTRACT

Provided is a composite seal member that can maintain performance such as vacuum seal performance, plasma resistance, and corrosive gas resistance over a long period. The composite seal member is mounted in a seal groove provided in a body surface of a first member, and establishes a sealed state between the first member and a second member when the second member is moved closer toward the first member. The composite seal member includes a first seal member disposed on the side of a first side wall of the seal groove and made of an elastic member, and a second seal member disposed on the side of a second side wall of the seal groove and made of a material that is harder than the first seal member. The second seal member has at least a second side wall abutment surface that extends generally in parallel with and makes surface contact with the second side wall of the seal groove, and a seal abutment surface that extends generally in parallel with a seal surface of the second member, and that makes surface contact with the seal surface of the second member in the sealed state.

14 Claims, 9 Drawing Sheets

(56) References Cited

U.S. PATENT DOCUMENTS

| | | | | |
|---|---|---|---|---|
| 3,582,094 A * | 6/1971 | Whittaker | F16J 15/56 | 277/584 |
| 3,693,986 A * | 9/1972 | Lambie | F16K 41/04 | 277/638 |
| 3,716,245 A * | 2/1973 | Turolla | F01C 19/125 | 277/584 |
| 3,848,880 A * | 11/1974 | Tanner | F16J 15/32 | 277/584 |
| 4,268,045 A * | 5/1981 | Traub | F16F 9/363 | 277/589 |
| 4,431,217 A * | 2/1984 | Witt | F16J 15/065 | 285/108 |
| 4,570,944 A * | 2/1986 | Traub | F16J 15/56 | 277/572 |
| 4,630,833 A * | 12/1986 | Boyle | F16J 15/166 | 277/322 |
| 4,893,823 A * | 1/1990 | Strouse | F16J 15/166 | 277/437 |
| 5,143,382 A * | 9/1992 | Maringer | F16J 15/164 | 277/584 |
| 5,346,230 A * | 9/1994 | Schumacher | F16J 15/166 | 277/551 |
| 6,163,007 A | 12/2000 | Tanaka et al. | | |
| 7,866,669 B2 * | 1/2011 | Kobayashi | F16J 15/062 | 277/584 |
| 7,896,354 B2 | 3/2011 | Muramatsu | | |
| 8,021,488 B2 | 9/2011 | Tanaka | | |
| 8,129,663 B2 | 3/2012 | Masaki et al. | | |
| 2007/0075503 A1 | 8/2007 | Hayashi et al. | | |
| 2008/0018058 A1 | 1/2008 | Kobayashi et al. | | |
| 2008/0018059 A1 * | 1/2008 | Otuka | F16J 15/3216 | 277/650 |
| 2008/0088097 A1 | 4/2008 | Tanaka | | |
| 2009/0174152 A1 | 7/2009 | Muramatsu | | |
| 2009/0189358 A1 * | 7/2009 | Briscoe | F16J 15/3216 | 277/584 |
| 2009/0321412 A1 | 12/2009 | Masaki et al. | | |
| 2012/0104300 A1 | 5/2012 | Dowd et al. | | |
| 2014/0070494 A1 * | 3/2014 | Winkelmann | F16J 15/166 | 277/314 |
| 2016/0245406 A1 * | 8/2016 | Ryther | F16J 15/3208 | |
| 2016/0348461 A1 * | 12/2016 | Ito | E21B 34/10 | |
| 2016/0356381 A1 * | 12/2016 | Henmi | F16J 15/26 | |
| 2017/0030466 A1 * | 2/2017 | Fonville | F16J 15/166 | |
| 2017/0067561 A1 * | 3/2017 | Alam | F16J 15/022 | |
| 2017/0211703 A1 * | 7/2017 | Hatano | F16J 15/062 | |
| 2018/0031129 A1 * | 2/2018 | Wallace | F16J 15/3284 | |
| 2018/0372223 A1 * | 12/2018 | Yoshitsune | F16J 15/166 | |

FOREIGN PATENT DOCUMENTS

| | | | | |
|---|---|---|---|---|
| JP | 03113179 A * | 5/1991 | F16J 15/062 |
| JP | 2001-124213 A | 5/2001 | |
| JP | 2005-164027 A | 6/2005 | |
| JP | 2007-120738 A | 5/2007 | |
| JP | 2009-144735 A | 7/2009 | |
| JP | 2009-174627 A | 8/2009 | |
| JP | 2012-072863 A | 4/2012 | |
| JP | 4985973 B2 | 7/2012 | |
| JP | 2012154388 A * | 8/2012 | F16J 15/166 |
| TW | 451343 B | 8/2001 | |
| TW | 477881 B | 3/2002 | |
| TW | 414700 B | 11/2013 | |

* cited by examiner

COMPOSITE SEAL MEMBER

CROSS-REFERENCE TO RELATED APPLICATIONS

This application is the United States national phase of International Application No. PCT/JP2018/002066 filed Jan. 24, 2018, and claims priority to Japanese Patent Application No. 2017-015233 filed Jan. 31, 2017, the disclosures of which are hereby incorporated by reference in their entirety.

TECHNICAL FIELD

The present invention relates to a composite seal member that is used in a vacuum state, for example, and in particular to a composite seal member that is suitably used for a semiconductor manufacturing device.

BACKGROUND ART

As semiconductor manufacturing devices are improved, there are stricter and more diverse requirements for members to be used for the semiconductor manufacturing devices.

For example, vacuum seal performance is needed as the basic performance for seal materials that are used for the semiconductor manufacturing devices such as dry etching devices and plasma CVD devices. The seal materials are required to have a combination of plasma resistance and corrosive gas resistance, depending on the device for which the seal material is used and the location at which the seal material is mounted.

Fluorocarbon rubber, which is unlikely to be affected by a fluid, has been used in seal regions in which plasma resistance and corrosive gas resistance are desired in addition to vacuum seal performance.

As the conditions of use become stricter, however, the performance of the fluorocarbon rubber such as plasma resistance and corrosive gas resistance becomes insufficient, and there is a demand for a new material.

In order to meet such a demand, the inventors already proposed a composite seal member disclosed in Japanese patent application JPA 2009-174627 as a composite seal member that had a combination of vacuum seal performance, plasma resistance, and corrosive gas resistance and that was able to maintain desired vacuum seal performance even after repeated use.

As illustrated in FIG. 8, a composite seal member 100 disclosed in PTL 1 is mounted in a one-sided dovetail groove 112 formed in a first member 110, and composed of a first seal member 130 made of an elastic member (e.g. fluorocarbon rubber) and a second seal member 140 made of a material (e.g. a fluorocarbon resin) that is harder than the first seal member 130.

In the composite seal member 100, the first seal member 130 mainly secures vacuum seal performance, and the second seal member 140 secures resistance such as plasma resistance and corrosive gas resistance.

SUMMARY OF INVENTION

Technical Problem

In the composite seal member 100 according to the related art, however, a seal abutment surface 142 of the second seal member 140 that abuts against a second member 120 is a curved surface with an arcuate cross section. Therefore, in a sealed state illustrated in FIG. 9, both the area of abutment of the seal abutment surface 142 of the second seal member 140 against a seal surface 122 of the second member 120 and the area of abutment of an inner peripheral wall abutment surface 144 of the second seal member 140 with an inner peripheral wall 114 of the one-sided dovetail groove 112 tend to be small.

When the areas of abutment are small, it may be difficult for the second seal member 140 to secure resistance against corrosive gases and plasma, which are present on the inner peripheral side, for a long period.

In the composite seal member 100 according to the related art, in addition, a bottom portion 132 of the first seal member 130 is provided with an outer peripheral protrusion 136 positioned at an end portion on the side of an outer peripheral wall 116 of the one-sided dovetail groove 112 and an inner peripheral protrusion 134 positioned at an end portion on the side of the inner peripheral wall 114, and a large space 150 is formed between the outer peripheral protrusion 136 and the inner peripheral protrusion 134. Therefore, it is assumed that, in the sealed state, the first seal member 130 and the second seal member 140 roll toward the space 150 from their respective original positions as indicated by the arrows in FIG. 9. Therefore, in order to exhibit reliable seal properties, it is necessary that the seal abutment surface 142 of the second seal member 140 should be formed with a curved surface with an arcuate cross section.

Thus, the real situation is that a further improved composite seal member is desired in order to secure resistance against corrosive gases and plasma, which are present on the inner peripheral side, for a long period.

The present invention has been made in view of such a real situation, and has an object to provide a composite seal member that can reliably maintain performance such as vacuum seal performance, plasma resistance, and corrosive gas resistance over a long period.

Solution to Problem

The present invention has been made to solve the foregoing problem.

The present invention provides a composite seal member that is mounted in a seal groove provided in a body surface of a first member and that establishes a sealed state between the first member and a second member when the second member is moved closer toward the first member, characterized in that the composite seal member includes
a first seal member disposed on a side of a first side wall of the seal groove and made of an elastic member, and
a second seal member disposed on a side of a second side wall of the seal groove and made of a material that is harder than the first seal member, and
the second seal member has at least
a second side wall abutment surface that extends generally in parallel with and makes surface contact with the second side wall of the seal groove, and
a seal abutment surface that extends generally in parallel with a seal surface of the second member, and that makes surface contact with the seal surface of the second member in the sealed state.

With such a configuration, in the sealed state, surface contact is made over a wide range both between the second seal member and the seal surface of the second member and between the second seal member and the second side wall of the seal groove. Therefore, performance such as vacuum seal performance, plasma resistance, and corrosive gas resistance can be reliably maintained over a long period.

The thus configured composite seal member is particularly suitable in an environment in which the sealed state between the first member and the second member is maintained over a long period, since the areas of abutment of the second side wall abutment surface and the seal abutment surface of the second seal member with the second side wall of the seal groove and the seal surface of the second member, respectively, are large.

In the composite seal member according to the present invention,
the first seal member has at least
a seal projecting portion that projects toward the seal surface of the second member with respect to the body surface of the first member,
a lateral swelling portion that swells toward the first side wall of the seal groove,
a bottom portion that abuts against a bottom surface of the seal groove, and
a placement portion for placement of the second seal member.

With the thus configured first seal member, vacuum seal performance can be reliably maintained over a long period between the first seal member and the seal surface of the second member, in particular.

In the composite seal member according to the present invention,
a center position, in a vertical direction, of the lateral swelling portion of the first seal member is positioned between an upper end portion and a lower end portion, in the vertical direction, of the second seal member which is placed on the placement portion.

With such a configuration, an equal force is easily applied to both the first seal member and the second seal member when the composite seal member is pressed by the second member, which reliably prevents occurrence of rolling.

In the composite seal member according to the present invention,
the composite seal member is mounted in a seal groove in which a height of the first side wall is set to be higher than a height of the second side wall.

If the height of the first side wall of the seal groove and the height of the second side wall are different from each other, the composite seal member can reliably seal a space between the first member and the second member without the second member, which has been warped, contacting the first member on the side of the second side wall, even if a part of the second member positioned on the side of the second side wall is warped toward the first member by a pressure in a vacuum environment.

In the composite seal member according to the present invention,
in the sealed state, a width, in a horizontal direction, of the seal abutment surface of the second seal member is four times or more a height, in a vertical direction, from the body surface on the side of the second side wall of the seal groove of the first member to the seal surface of the second member.

By setting the width, in the horizontal direction, of the seal abutment surface of the second seal member in this manner, performance such as plasma resistance and corrosive gas resistance, in particular, can be reliably maintained over a long period.

In the composite seal member according to the present invention,
in the sealed state, a width, in a vertical direction, of the second side wall abutment surface of the second seal member is four times or more a height, in a vertical direction, from the body surface on the side of the second side wall of the seal groove of the first member to the seal surface of the second member.

By setting the width, in the vertical direction, of the second side wall abutment surface of the second seal member in this manner, performance such as plasma resistance and corrosive gas resistance, in particular, can be reliably maintained over a long period.

In the composite seal member according to the present invention,
the bottom portion of the first seal member has at least
a first protrusion positioned at an end portion on the side of the first side wall of the seal groove,
a second protrusion positioned at an end portion on the side of the second side wall of the seal groove, and
a middle protrusion positioned between the first protrusion and the second protrusion.

If at least three kinds of protrusions are provided in this manner, occurrence of rolling into a large space formed between the first protrusion and the second protrusion can be reliably prevented unlike the related art.

In the sealed state, in particular, the middle protrusion blocks a part of the first seal member from entering a space between the first protrusion and the second protrusion. Therefore, the composite seal member is not easily deformed in the rotational direction, which reliably prevents rolling.

In the composite seal member according to the present invention,
a recessed portion is provided in the first seal member between the seal projecting portion and the placement portion for placement of the second seal member.

If the recessed portion is provided at such a position, a part of the seal projecting portion of the first seal member, which first abuts against the second member to be deformed, enters the recessed portion, which prevents occurrence of rolling as a whole. That is, the recessed portion functions as an escape area during deformation. Therefore, movement of other portions can be reduced to a minimum, which prevents occurrence of rolling.

In the composite seal member according to the present invention,
a center position, in a horizontal direction, of the middle protrusion and a center position, in the horizontal direction, of the recessed portion are generally same as each other.

If the middle protrusion is positioned directly under the recessed portion, a part of the first seal member is not deformed significantly, even if deformed, when approaching the sealed state, and occurrence of rolling as a whole can be prevented as much as possible.

In the composite seal member according to the present invention,
a center position, in a horizontal direction, of the seal projecting portion of the first seal member is positioned between the first protrusion and the middle protrusion.

With such a configuration, a part of the first seal member enters a small gap formed between the first protrusion and the middle protrusion straight in the vertical direction when the seal projecting portion abuts against the second member to approach the sealed state, which reliably prevents occurrence of rolling.

In the composite seal member according to the present invention,
the first seal member and the second seal member are bonded to each other using an adhesive.

If the first seal member and the second seal member are bonded to each other using an adhesive, the members can be fixed easily and securely to each other.

In the composite seal member according to the present invention, the first seal member and the second seal member are assembled to each other using a projecting fitting portion formed on one of the first and second seal members and a recessed fitting portion formed in the other.

With such a configuration, the first seal member and the second seal member can be assembled together in advance.

Advantageous Effects of Invention

In the composite seal member according to the present invention, in particular, the second seal member has a second side wall abutment surface that extends generally in parallel with and makes surface contact with the second side wall of the seal groove, and a seal abutment surface that extends generally in parallel with a seal surface of the second member, and that makes surface contact with the seal surface of the second member in the sealed state. Thus, it is possible to reliably maintain performance such as vacuum seal performance, plasma resistance, and corrosive gas resistance over a long period.

DESCRIPTION OF THE INVENTION AND EMBODIMENTS

An embodiment of the present invention will be described in detail below with reference to the drawings.

A composite seal member 10 according to the present invention is used for semiconductor manufacturing devices such as dry etching devices and plasma CVD devices, and has a combination of plasma resistance and corrosive gas resistance in addition to vacuum seal performance.

Figure 1:
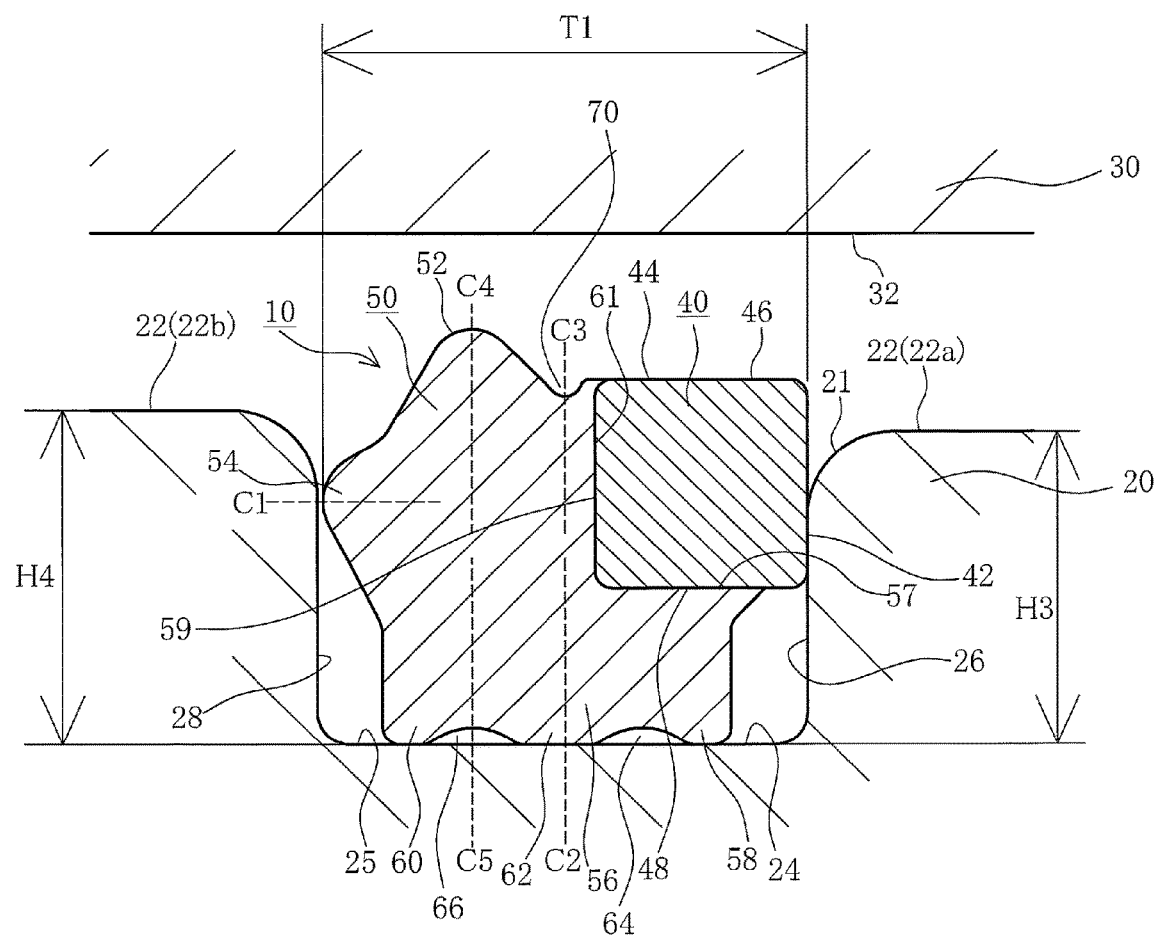
FIG. 1 is a cross-sectional view illustrating a state in which a composite seal member according to the present invention is mounted in a rectangular groove that serves as a seal groove.

As illustrated in FIG. 1, the composite seal member 10 is mounted in a seal groove (rectangular groove) 24 in a rectangular shape in which a second side wall (an inner peripheral wall 26 in the present embodiment) and a first side wall (an outer peripheral wall 28 in the present embodiment) extend generally vertically.

The seal groove 24 is formed at a fixed portion with no operation such as a joint portion composed of a first member 20 and a second member 30 of a semiconductor manufacturing device such as a dry etching device and a plasma CVD device, for example.

The first member 20 and the second member 30 can be brought into a sealed state via the composite seal member 10 therebetween by mounting the composite seal member 10, which is composed of a first seal member 50 and a second seal member 40, in the seal groove 24 and bringing the second member 30 closer toward the first member 20.

In the composite seal member 10, the first seal member 50, which is made of an elastic member, is disposed on the side of the outer peripheral wall 28 (side of outside air side) of the seal groove 24, and the second seal member 40, which is made of a material that is harder than the first seal member 50, is disposed on the side of the inner peripheral wall 26 (side of a severe environment such as corrosive gases and plasma) of the seal groove 24.

The first seal member 50 has: a seal projecting portion 52 that projects toward a seal surface 32 of the second member 30 with respect to a body surface 22 of the first member 20; a lateral swelling portion 54 that swells toward the outer peripheral wall 28 of the seal groove 24; a bottom portion 56 that abuts against a bottom surface 25 of the seal groove 24; and a placement portion 57 for placement of the second seal member 40.

In contrast, the second seal member 40 has: a second side wall abutment surface (an inner peripheral wall abutment surface 42 in the present embodiment) that extends generally in parallel with and makes surface contact with the inner peripheral wall 26 of the seal groove 24; and a seal abutment surface 44 that extends generally in parallel with the seal surface 32 of the second member 30, and that makes surface contact with the seal surface 32 of the second member 30 in the sealed state. The second seal member 40 is configured to be placed on the placement portion 57 of the first seal member 50.

The first seal member 50, which is made of an elastic member, is preferably constituted from rubber. Either of natural rubber and synthetic rubber is usable as the rubber. When the first seal member 50 is constituted from rubber, the seal projecting portion 52 of the first seal member 50 is press-contacted by the seal surface 32 of the second member 30 when the composite seal member 10 is press-contacted between the first member 20 and the second member 30, which provides high seal performance.

In the case where the first seal member 50 is constituted of synthetic rubber, the synthetic rubber is preferably fluorocarbon rubber.

Examples of the fluorocarbon rubber include: binary-system vinylidene fluoride rubber such as a vinylidene fluoride/hexafluoropropylene copolymer, a vinylidene fluoride/trifluorochloroethylene copolymer, and a vinylidene fluoride/pentafluoropropylene copolymer; ternary-system vinylidene fluoride rubber such as a vinylidene fluoride/tetrafluoroethylene/hexafluoropropylene copolymer, a vinylidene fluoride/tetrafluoroethylene/perfluoroalkylvinylether copolymer, and a vinylidene fluoride/tetrafluoroethylene/propylene copolymer; a tetrafluoroethylene/propylene copolymer; a tetrafluoroethylene/perfluoroalkylvinylether copolymer; and thermoplastic fluorocarbon rubber.

If the first seal member 50 is made of such fluorocarbon rubber, the first seal member 50 is highly resistant to corrosive gases and plasma, and the seal performance of the first seal member 50 is not degraded even if the first seal member 50 contacts a corrosive gas or plasma.

On the other hand, the second seal member 40 may be made of a material that is harder than the first seal member 50 and that is resistant to corrosive gases, plasma, etc. Examples of the material include a synthetic resin, a member in which the outer surface of a synthetic resin is coated with a film that is resistant to corrosive environments, one or more kinds of metal selected from stainless steel, an aluminum alloy, a nickel alloy, titanium, etc., and one or more kinds of inorganic materials selected from soft glass, hard glass, silica grass, ceramics, etc., which are suitable for vacuum environments.

Examples of the synthetic resin include one or more kinds of synthetic resins selected from a fluorocarbon resin, a polyimide resin, a polyamide-imide resin, a polyetherimide resin, a polybenzimidazole resin, and a polyetherketone resin.

In particular, examples of the fluorocarbon resin, which is one kind of the synthetic resins described above, include a polytetrafluoroethylene (PTFE) resin, a tetrafluoroethylene-perfluoroalkylvinylether copolymer (PFA) resin, a tetrafluoroethylene-hexafluoropropylene copolymer (FEP) resin, a tetrafluoroethylene-ethylene copolymer (ETFE) resin, a polyvinylidene fluoride (PVDF) resin, a polychlorotrifluoroethylene(PCTFE) resin, a chlorotrifluoroethylene-ethylene copolymer (ECTFE) resin, and a polyvinyl fluoride (PVF) resin. Among these, a polytetrafluoroethylene (PTFE) resin is preferable in consideration of heat resistance, corrosive gas resistance, plasma resistance, etc.

In the composite seal member 10 according to the present invention, because of a seal shape to be discussed later, the seal abutment surface 44 of the second seal member 40 reliably tightly abuts against the seal surface 32 of the second member 30, and a stress applied to the surface of the second seal member 40 is suppressed to be low by the elastic force of the first seal member 50. Thus, the surface of the second seal member 40 is not deformed, and a risk of generation of dust due to breakage of the surface can be suppressed.

The first seal member 50 and the second seal member 40 are preferably joined to and integrated with each other. A known joining method such as welding, fusing, and bonding can be adopted. An adhesive is preferably used, and a heat-resistant adhesive is more preferably used. In the case where an adhesive is applied, the adhesive may be applied to the entire surface or only a part thereof.

The first seal member 50 and the second seal member 40 may be joined to and integrated with each other at a location between the placement portion 57 of the first seal member 50 and a lower end portion 48 of the second seal member 40 and/or a location between a vertical surface 61 of the first seal member 50 and a side end surface 59 of the second seal member 40.

Figure 2:
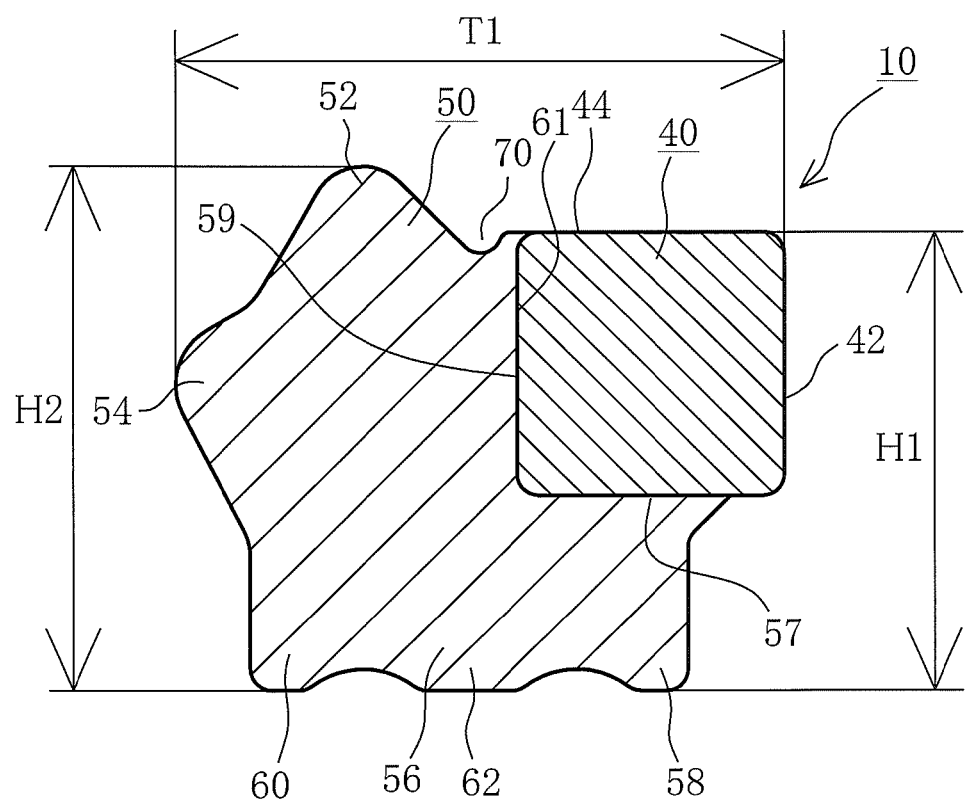
FIG. 2 is a cross-sectional view of the composite seal member according to the present invention.

In the composite seal member 10, as illustrated in FIG. 2, a height H1, in the vertical direction, from the lower end portion of the bottom portion 56 of the first seal member 50 to the seal abutment surface 44 of the second seal member 40 is set to be smaller than a height H2, in the vertical direction, from the lower end portion of the bottom portion 56 of the first seal member 50 to the upper end portion of the seal projecting portion 52.

Figure 3:
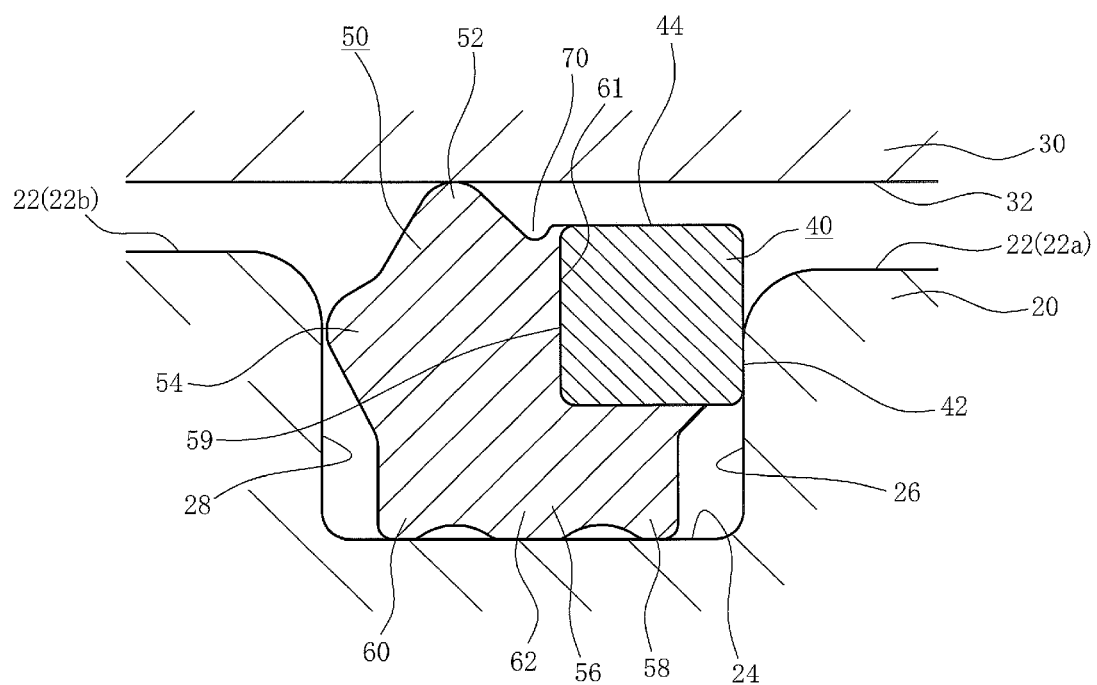
FIG. 3 is a cross-sectional view illustrating a state in which the composite seal member according to the present invention is mounted in the rectangular groove which serves as the seal groove and a second member is moved toward a first member.

Consequently, when the second member 30 is brought closer toward the first member 20 with the composite seal member 10 mounted in the seal groove 24 of the first member 20, the seal projecting portion 52 of the first seal member 50 first contacts the seal surface 32 of the second member 30 as illustrated in FIG. 3, which secures vacuum seal performance first.

A center position C1, in the vertical direction, of the lateral swelling portion 54 of the first seal member 50 is positioned between an upper end portion 46 and the lower end portion 48, in the vertical direction, of the second seal member 40 which is placed on the placement portion 57.

Consequently, an equal force is easily applied to both the first seal member 50 and the second seal member 40 when the composite seal member 10 is pressed by the second member 30 when approaching the sealed state, which reliably prevents occurrence of rolling unlike the related art.

It is assumed that the composite seal member 10 according to the present invention is used in very severe environments. In order for the composite seal member 10 to maintain desired seal performance during use in such severe environments, the following contrivance is made.

A height H4 of the outer peripheral wall 28 of the seal groove 24 is set to be larger than a height H3 of the inner peripheral wall 26.

That is, by setting a body surface 22a on the inner peripheral side (on the inner peripheral wall 26 side) to be lower than a body surface 22b on the outer peripheral side (on the outer peripheral wall 28 side), the first member 20 on the inner peripheral side and the second member 30 do not contact each other, and in other words, a metal touch is not caused, even if the second member 30 which is positioned on the inner peripheral side is warped in a vacuum state, which allows a space between the two members to be reliably sealed by the composite seal member 10.

Figure 4:
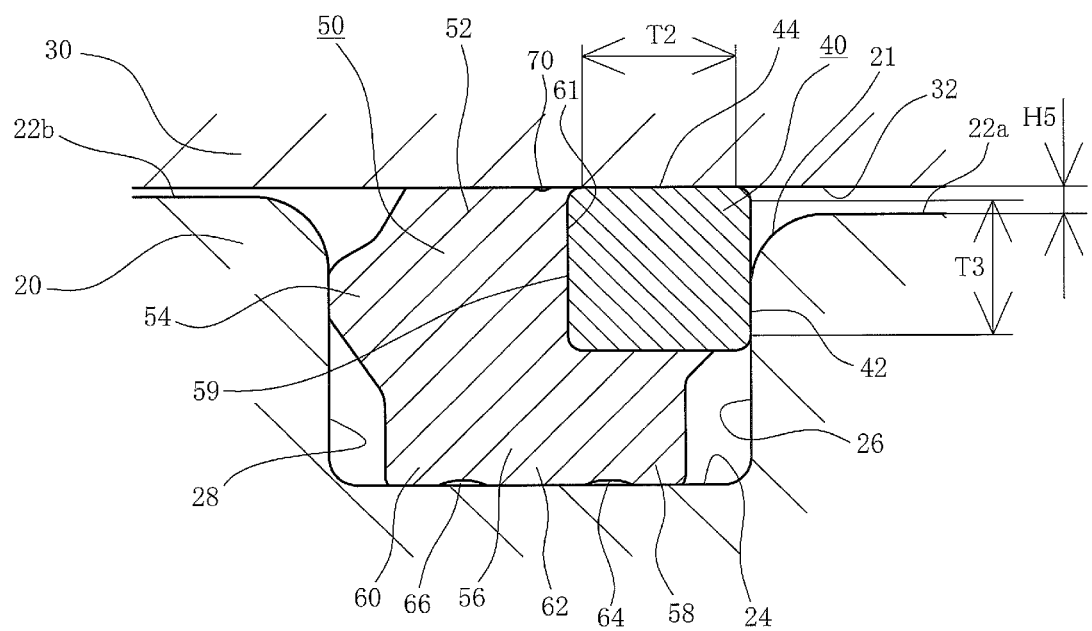
FIG. 4 is a cross-sectional view illustrating a state in which the composite seal member according to the present invention is mounted in the rectangular groove which serves as the seal groove and sealed.

When the composite seal member 10 according to the present invention is mounted in the seal groove 24, the second member 30 is brought closer toward the first member 20, and the second member 30 is continuously pressed from a state in which the seal projecting portion 52 of the first seal member 50 abuts against the second member 30 as illustrated in FIG. 3, the seal abutment surface 44 of the second seal member 40 tightly abuts against the seal surface 32 of the second member 30 as illustrated in FIG. 4, which achieves a completely sealed state with plasma resistance and corrosive gas resistance in addition to vacuum seal performance.

In the sealed state, a width T2, in the horizontal direction, of the seal abutment surface 44 of the second seal member 40 is preferably four times or more a height H5, in the vertical direction, from the body surface 22a on the inner peripheral side of the first member 20 to the seal surface 32 of the second member 30 via the seal groove 24.

By setting the width T2, in the horizontal direction, of the seal abutment surface 44 of the second seal member 40 in this manner, performance such as plasma resistance and corrosive gas resistance, in particular, can be reliably maintained over a long period.

In the sealed state, similarly, a width T3, in the vertical direction, of the inner peripheral wall abutment surface 42 of the second seal member 40 is preferably four times or more the height H5, in the vertical direction, from the body surface 22a on the inner peripheral side of the first member 20 to the seal surface 32 of the second member 30 via the seal groove 24.

With such an inner peripheral wall abutment surface 42, the inner peripheral wall 26 of the seal groove 24 and the inner peripheral wall abutment surface 42 of the second seal member 40 can abut against each other over a sufficient area even if a corner portion 21 between the inner peripheral wall 26 of the seal groove 24 and the body surface 22a on the inner peripheral side has been rounded, which reliably maintains performance such as plasma resistance and corrosive gas resistance over a long period.

In general, the rounding radius of the corner portion 21 between the inner peripheral wall 26 of the seal groove 24 and the body surface 22a is set in the range of 6 to 26% of the seal groove depth. The seal groove depth is the larger one of the height H3 of the inner peripheral wall 26 on the inner peripheral side of the seal groove 24 and the height H4 of the outer peripheral wall 28 on the outer peripheral side thereof.

Further, the width T2, in the horizontal direction, of the seal abutment surface 44 of the second seal member 40 described above and the width T3, in the vertical direction, of the inner peripheral wall abutment surface 42 of the second seal member 40 are preferably generally equal to each other. However, the ratio of T2:T3, that is, the ratio of the horizontal dimension to the vertical dimension of the second seal member 40, is preferably in the range of 1:0.5 to 2.0, more preferably 1:1.0 to 1.8, in order to maintain desired seal performance over a long period.

As illustrated in FIG. 1, the bottom portion 56 of the composite seal member 10 is provided with a first protrusion (an outer peripheral protrusion 60 in the present embodiment) positioned at an end portion on the side of the outer peripheral wall 28 of the seal groove 24, a second protrusion (an inner peripheral protrusion 58 in the present embodiment) positioned at an end portion on the side of the inner peripheral wall 26 of the seal groove 24, and a middle protrusion 62 positioned between the outer peripheral protrusion 60 and the inner peripheral protrusion 58.

Consequently, small spaces 66 and 64 are formed between the outer peripheral protrusion 60 and the middle protrusion 62 and between the inner peripheral protrusion 58 and the middle protrusion 62, respectively.

A recessed portion 70 is provided between the seal projecting portion 52 of the first seal member 50 and the placement portion 57 for placement of the second seal member 40. A center position C3, in the horizontal direction, of the recessed portion 70 and a center position C2, in the horizontal direction, of the middle protrusion 62 of the bottom portion 56 are generally the same as each other.

By disposing the recessed portion 70 and the middle protrusion 62 in such positional relationship, the middle protrusion 62, in particular, can physically block a part of the first seal member 50 from entering a space formed between the outer peripheral protrusion 60 and the inner peripheral protrusion 58 in the sealed state, unlike the related art.

When approaching the sealed state, a part of the seal projecting portion 52 of the first seal member 50, which first abuts against the second member 30 to be deformed, enters the recessed portion 70, which functions as an escape region during deformation. Therefore, movement of other portions can be reduced to a minimum.

At this time, the middle protrusion 62 is positioned directly under the recessed portion 70. Therefore, the entire composite seal member 10 is not deformed significantly even if a part of the first seal member 50 is deformed when approaching the sealed state.

The center position C3, in the horizontal direction, of the recessed portion 70 and the center position C2, in the horizontal direction, of the middle protrusion 62 of the bottom portion 56 are preferably at the same position as each other. However, it is allowable if the amount of displacement of the center position C2 to the right or the left with respect to the center position C3 is in the range of 5 to 10% of a maximum dimension T1, in the horizontal direction, of the composite seal member 10.

Further, a center position C4, in the horizontal direction, of the seal projecting portion 52 of the first seal member 50 is preferably a position C5 between the outer peripheral protrusion 60 and the middle protrusion 62.

With the synergetic effect of these, occurrence of rolling of the composite seal member 10 as a whole can be prevented as much as possible.

Thus, the composite seal member 10 according to the present invention is characterized as described above. In particular, the second seal member 40 has the inner peripheral wall abutment surface 42 which extends generally in parallel with and makes surface contact with the inner peripheral wall 26 of the seal groove 24, and the seal abutment surface 44 which extends generally in parallel with the seal surface 32 of the second member 30, and which makes surface contact with the seal surface 32 of the second member 30 in the sealed state. Thus, it is possible to reliably maintain performance such as plasma resistance and corrosive gas resistance, in addition to vacuum seal performance, over a long period.

Figure 5:
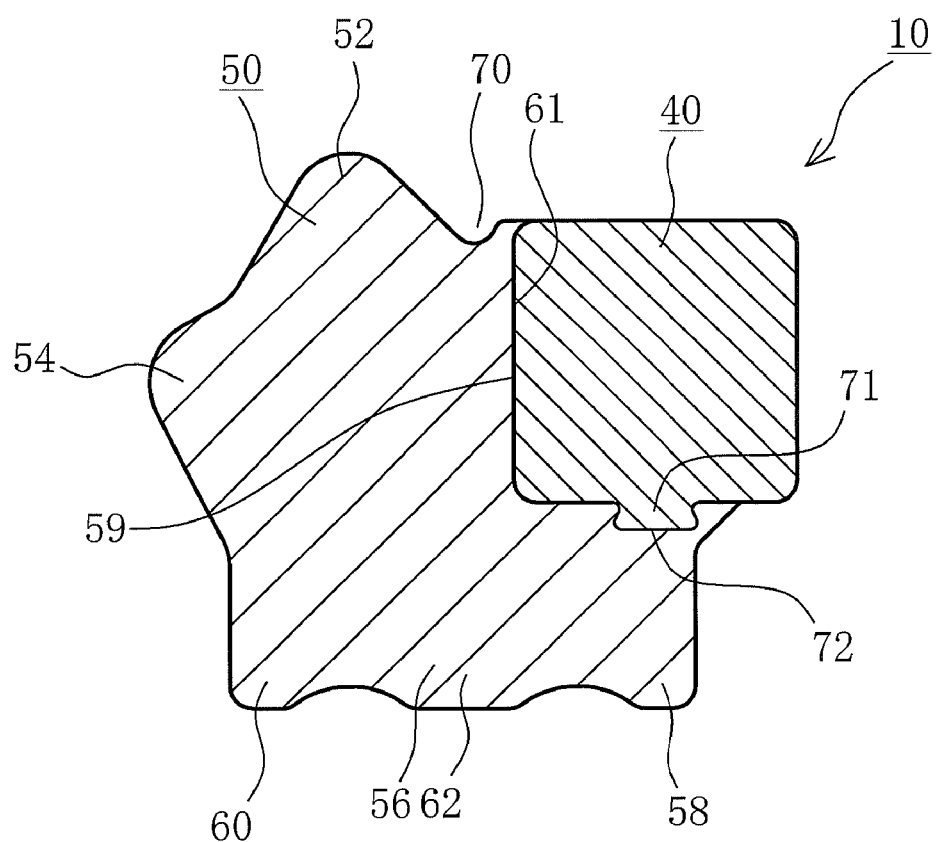
FIG. 5 is a cross-sectional view of a composite seal member according to a different embodiment of the present invention.

While the composite seal member 10 according to a preferable embodiment of the present invention has been described above, the present invention is not limited to the embodiment described above. For example, the second seal member illustrated in FIGS. 1 to 4 is placed on the placement portion 57 of the first seal member 50, and bonded using an adhesive. However, as illustrated in FIG. 5, one (the second seal member 40 in FIG. 5) of the first seal member 50 and the second seal member 40 may be provided with a projecting fitting portion 71, and the other (the first seal member 50 in FIG. 5) may be provided with a recessed fitting portion 72, to be fitted with each other. In the case of such a fitting structure, no adhesive is needed, but an adhesive for bonding may also be used in addition to fitting between recessed and projecting members.

Figure 6:
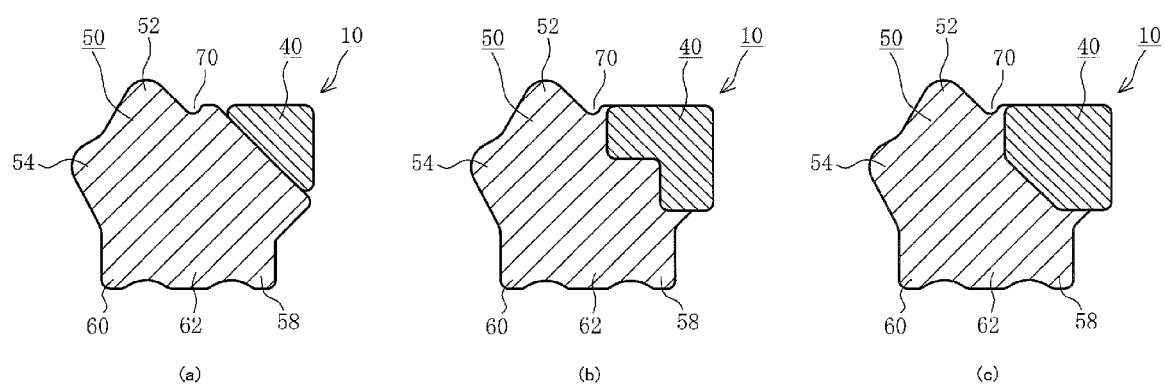
FIGS. 6(a) to 6(c) are each a cross-sectional view illustrating a composite seal member according to a different embodiment of the present invention.

Further, the second seal member 40 illustrated in FIGS. 1 to 4 has a generally rectangular cross section. Besides, however, the second seal member 40 may have a generally triangular cross section as illustrated in FIG. 6(a), a generally L-shaped cross section as illustrated in FIG. 6(b), a generally trapezoidal cross section as illustrated in FIG. 6(c), etc. In short, the cross-sectional shape of the second seal member 40 is not specifically limited as long as the second seal member 40 has at least the inner peripheral wall abutment surface 42 which extends generally in parallel with and makes surface contact with the inner peripheral wall 26 of the seal groove 24, and the seal abutment surface 44 which extends generally in parallel with the seal surface 32 of the second member 30, and which makes surface contact with the seal surface 32 of the second member 30 in the sealed state.

Figure 7:
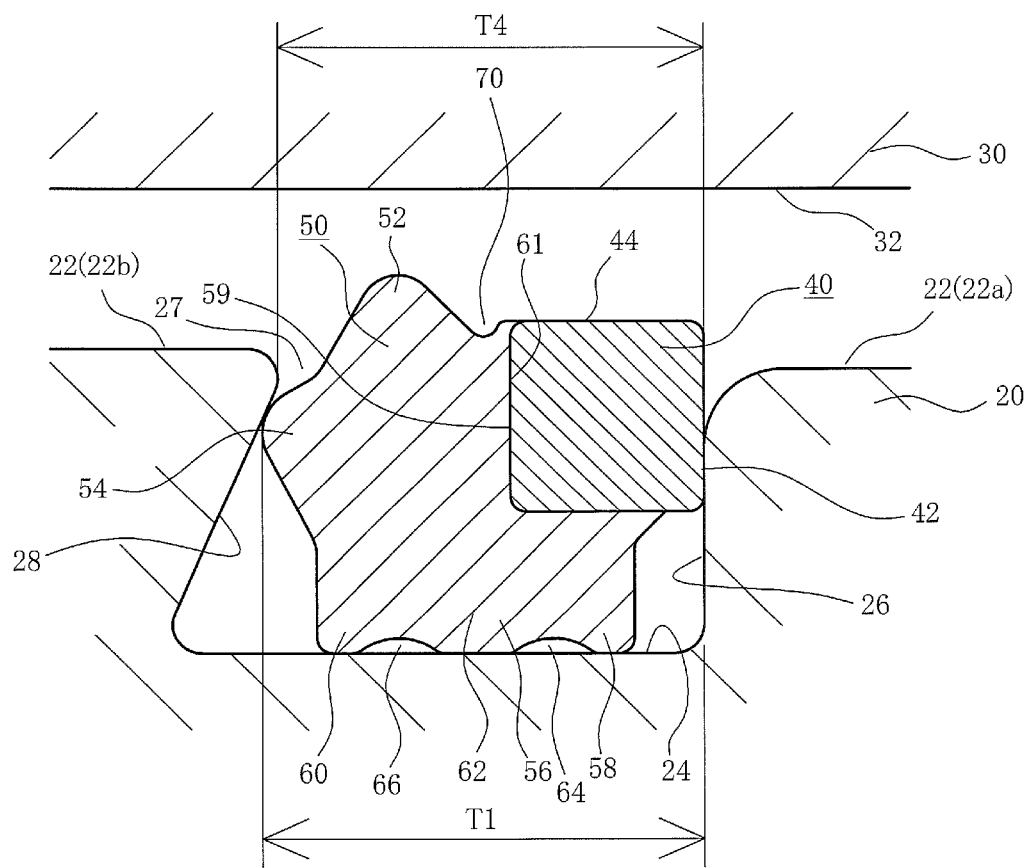
FIG. 7 is a cross-sectional view illustrating a state in which the composite seal member according to the present invention is mounted in a one-sided dovetail groove that serves as a seal groove.
Figure 8:
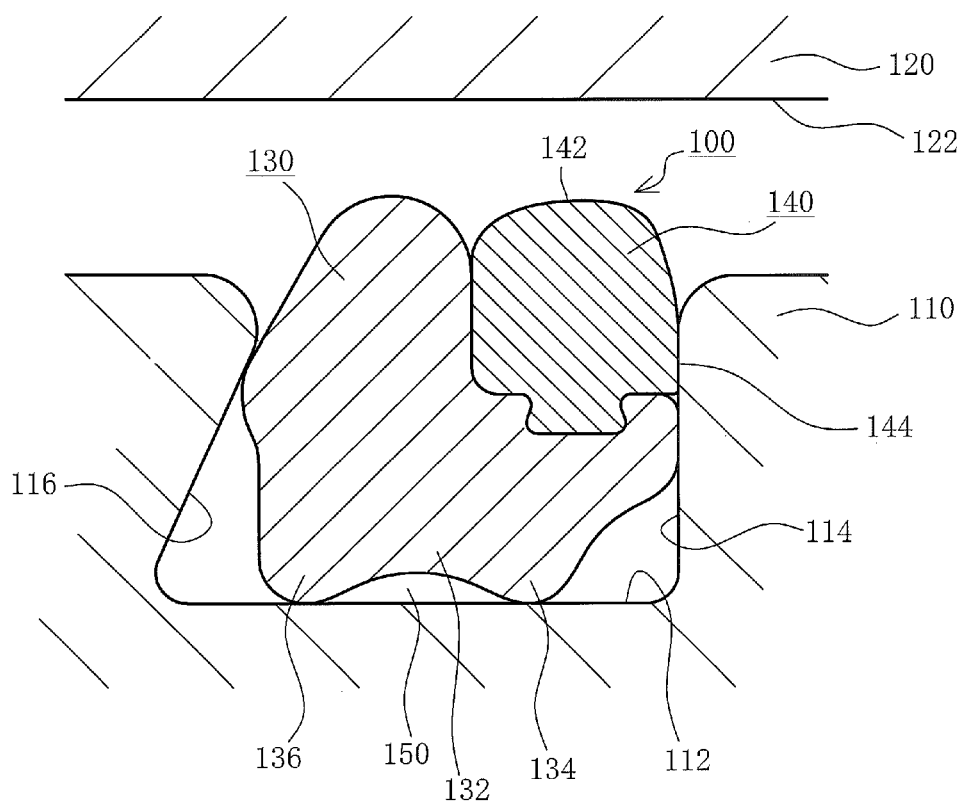
FIG. 8 is a cross-sectional view illustrating a state in which a composite seal member according to the related art is mounted in a one-sided dovetail groove that serves as a seal groove.
Figure 9:
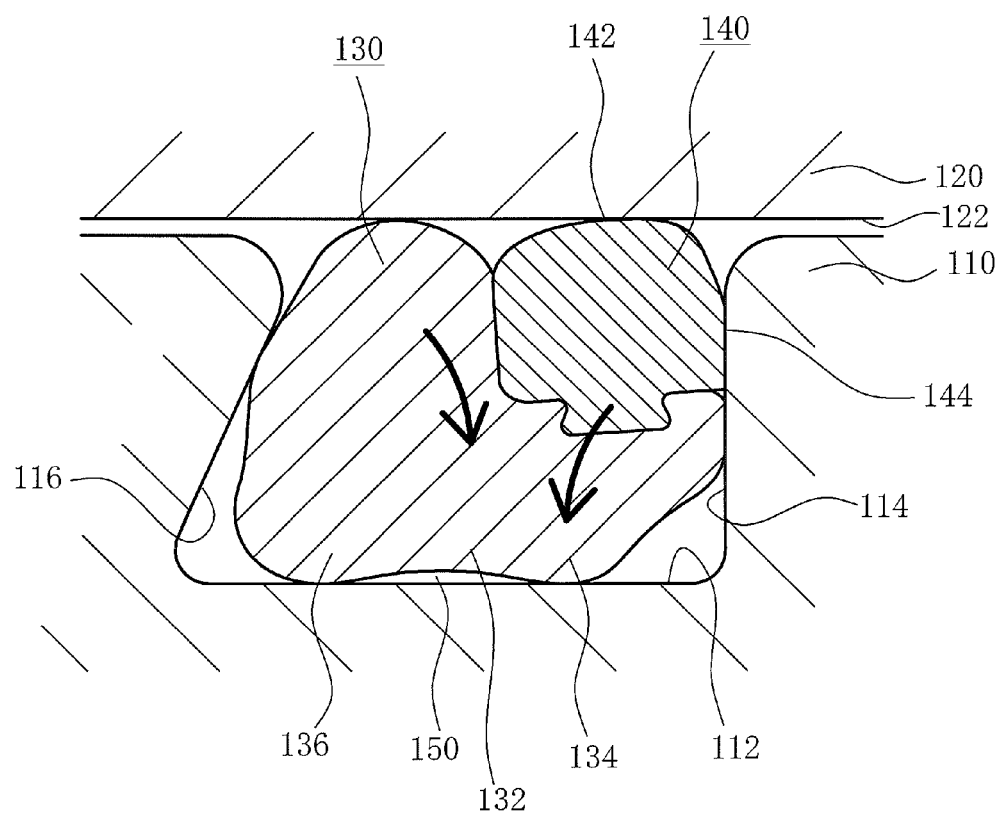
FIG. 9 is a cross-sectional view illustrating a state in which the composite seal member according to the related art is mounted in the one-sided dovetail groove which serves as the seal groove and sealed.

The composite seal member 10 according to the present invention is preferably mounted in the seal groove 24 which is a rectangular groove. In some cases, however, the composite seal member 10 according to the present invention may be mounted in a one-sided dovetail groove as illustrated in FIG. 7. In the case where the composite seal member 10 according to the present invention is mounted in a one-sided dovetail groove, the first seal member 50 may be positioned on the side of the outer peripheral wall 28 which is an inclined surface, and the lateral swelling portion 54 of the first seal member 50 may abut against the inclined surface of the one-sided dovetail groove at normal temperature.

When the composite seal member 10 is mounted in a one-sided dovetail groove, the maximum dimension T1, in the horizontal direction, of the composite seal member 10 is larger than a maximum dimension T4, in the horizontal direction, of an opening portion 27 of the one-sided dovetail groove, which prevents the composite seal member 10 from unexpectedly slipping off from the one-sided dovetail groove.

When mounting the composite seal member 10 in the rectangular groove described above, a location at which the sealed state is always maintained, except during maintenance or the like, after the sealed state is once established, that is, a fixed portion, is assumed.

When mounting the composite seal member 10 in a one-sided dovetail groove, on the other hand, a location at which the second member 30 is repeatedly moved away from the first member 20 after the sealed state is once established, that is, a movable portion, is assumed.

However, the present invention is not limited thereto, and a one-sided dovetail groove may be used for a fixed portion and a rectangular groove may be used for a movable portion.

Further, in the embodiment described above, the present invention is applied to a semiconductor device such as a dry etching device and a plasma CVD device. However, the composite seal member 10 according to the present invention may also be used for seal portions of different devices that are used under severe conditions in different environments.

Thus, a variety of changes can be made to the composite seal member 10 according to the present invention without departing from the purpose of the present invention.

The invention claimed is:

1. A composite seal member that is mounted in a seal groove provided in a body surface of a first member and that establishes a sealed state between the first member and a second member when the second member is moved closer toward the first member, characterized in that
the composite seal member includes
a first seal member disposed on a side of a first side wall of the seal groove and made of an elastic member, and
a second seal member disposed on a side of a second side wall of the seal groove and made of a material that is harder than the first seal member,
the second seal member has at least
a second side wall abutment surface that extends generally in parallel with and makes surface contact with the second side wall of the seal groove, and
a seal abutment surface that extends generally in parallel with a seal surface of the second member, and that makes surface contact with the seal surface of the second member in the sealed state, and
the first seal member has at least
a seal projecting portion that projects toward the seal surface of the second member with respect to the body surface of the first member,
a lateral swelling portion that swells toward the first side wall of the seal groove,
a bottom portion that abuts against a bottom surface of the seal groove, and
a placement portion for placement of the second seal member,
wherein a recessed portion is provided between the seal projecting portion and the placement portion.

2. The composite seal member according to claim 1, wherein a center position, in a vertical direction, of the lateral swelling portion of the first seal member is positioned between an upper end portion and a lower end portion, in the vertical direction, of the second seal member which is placed on the placement portion.

3. The composite seal member according to claim 1, wherein the composite seal member is mounted in a seal groove in which a height of the first side wall is set to be higher than a height of the second side wall.

4. The composite seal member according to claim 3, wherein, in the sealed state, a width, in a horizontal direction, of the seal abutment surface of the second seal member is four times or more a height, in a vertical direction, from the body surface on the side of the second side wall of the seal groove of the first member to the seal surface of the second member.

5. The composite seal member according to claim 3, wherein, in the sealed state, a width, in a vertical direction, of the second side wall abutment surface of the second seal member is four times or more a height, in a vertical direction, from the body surface on the side of the second side wall of the seal groove of the first member to the seal surface of the second member.

6. The composite seal member according to claim 1, wherein the bottom portion of the first seal member has at least
a first protrusion positioned at an end portion on the side of the first side wall of the seal groove,
a second protrusion positioned at an end portion on the side of the second side wall of the seal groove, and
a middle protrusion positioned between the first protrusion and the second protrusion.

7. The composite seal member according to claim 1, wherein a center position, in a horizontal direction, of the middle protrusion and a center position, in the horizontal direction, of the recessed portion are generally same as each other.

8. The composite seal member according to claim 6, wherein a center position, in a horizontal direction, of the seal projecting portion of the first seal member is positioned between the first protrusion and the middle protrusion.

9. The composite seal member according to claim 1, wherein the first seal member and the second seal member are bonded to each other using an adhesive.

10. The composite seal member according to claim 1, wherein the first seal member and the second seal member are assembled to each other using a projecting fitting portion formed on one of the first and second seal members and a recessed fitting portion formed in the other.

11. The composite seal member according to claim 2, wherein the composite seal member is mounted in a seal groove in which a height of the first side wall is set to be higher than a height of the second side wall.

12. The composite seal member according to claim 4, wherein, in the sealed state, a width, in a vertical direction, of the second side wall abutment surface of the second seal member is four times or more a height, in a vertical direction, from the body surface on the side of the second side wall of the seal groove of the first member to the seal surface of the second member.

13. The composite seal member according to claim 1, wherein a center position, in a horizontal direction, of the seal projecting portion of the first seal member is positioned between the first protrusion and the middle protrusion.

14. The composite seal member according to claim 7, wherein a center position, in a horizontal direction, of the seal projecting portion of the first seal member is positioned between the first protrusion and the middle protrusion.

* * * * *